United States Patent [19]

Acda

[11] 4,034,057
[45] July 5, 1977

[54] METHOD OF SHAPING A BELL END ON THERMOPLASTIC PIPE

[75] Inventor: Petrus Marinus Acda, Enkhuizen, Netherlands

[73] Assignee: Polva-Nederland B.V., Enkhuizen, Netherlands

[22] Filed: Jan. 15, 1976

[21] Appl. No.: 649,480

Related U.S. Application Data

[60] Division of Ser. No. 581,707, May 28, 1975, Pat. No. 3,998,578, which is a continuation of Ser. No. 408,562, Oct. 23, 1973, abandoned.

[30] Foreign Application Priority Data

Apr. 5, 1973 Netherlands .................... 7304761

[52] U.S. Cl. ............................... 264/297; 264/313; 264/322
[51] Int. Cl.² ................................... B29C 1/12
[58] Field of Search ............... 264/322, 297, 313; 425/393

[56] References Cited

UNITED STATES PATENTS

| | | | |
|---|---|---|---|
| 3,484,900 | 12/1969 | Sands | 264/322 X |
| 3,732,054 | 5/1973 | Lyng | 425/393 |
| 3,749,543 | 7/1973 | Stansbury | 425/393 |
| 3,755,528 | 8/1973 | Gutlhuber | 425/393 |
| 3,853,450 | 12/1974 | Acda | 425/393 |

*Primary Examiner*—Richard R. Kucia
*Attorney, Agent, or Firm*—Frank R. Trifari; David R. Treacy

[57] ABSTRACT

A method of shaping a bell end on a pipe of thermoplastic material, in which an elastic shaping ring is expanded radially in its operative position during the shaping of the bell end, and removed from the formed bell end by radial contraction. Part of a shaping mandril is moved to create a cavity into which the ring is free to contract.

2 Claims, 5 Drawing Figures

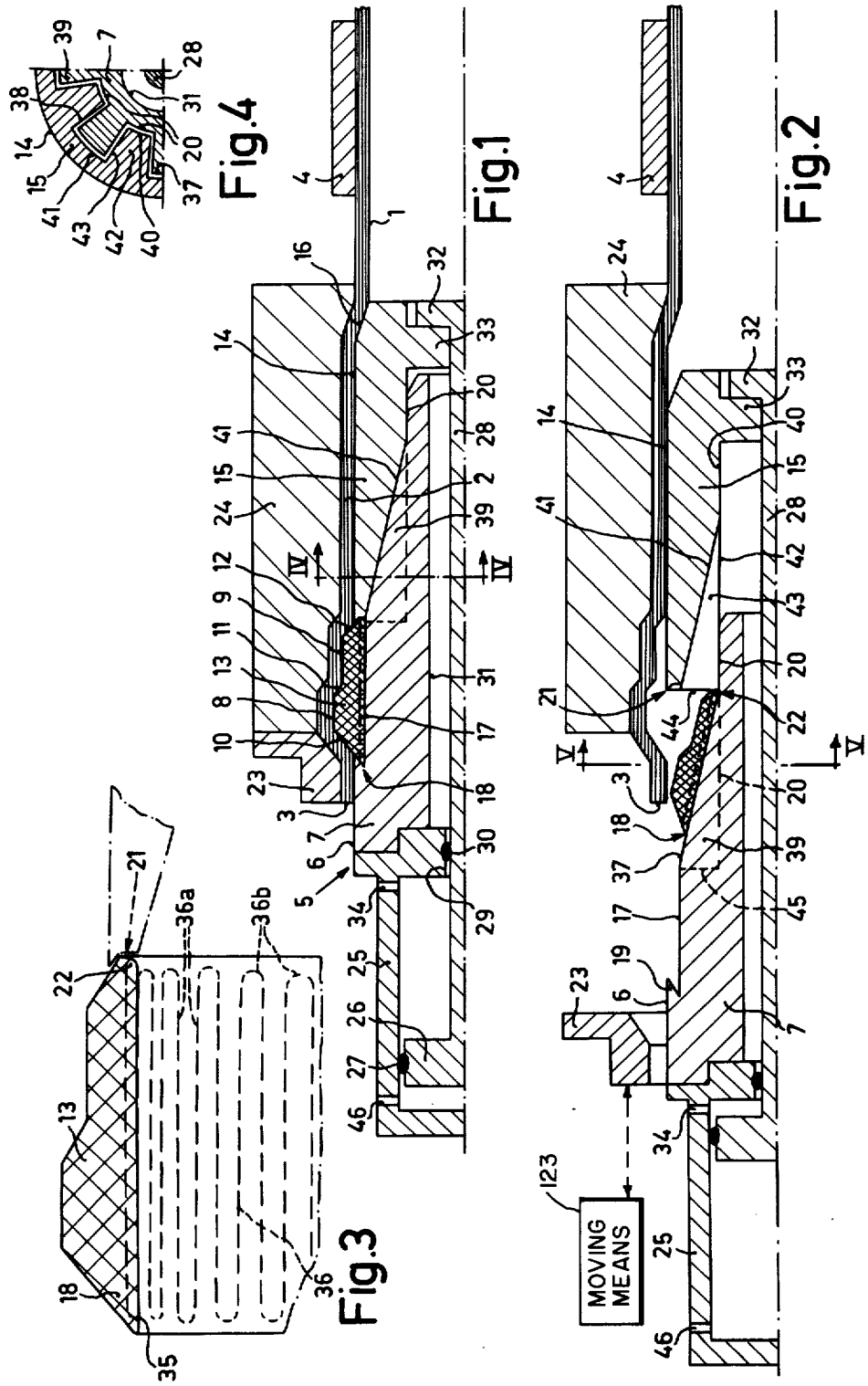

4,034,057

METHOD OF SHAPING A BELL END ON THERMOPLASTIC PIPE

REFERENCE TO PRIOR APPLICATION

This is a division of application Ser. No. 581,707 filed May 18, 1975 U.S. Pat. No. 3,998,578, which is a continuation of application Ser. No. 408,562 filed Oct. 23, 1973 and now abandoned.

BACKGROUND OF THE INVENTION

1. Field of the Invention

The invention relates to a method of shaping a bell end on a pipe of thermoplastic material, the opening of the bell end having a diameter which is smaller than the maximum diameter of the inner surface of the bell end and substantially equal to the outer diameter of the pipe, by means of a cylindrical shaping mandril which is to be axially inserted into the pre-heated pipe end.

2. Description of the Prior Art

In a method of this kind known from U.S. Pat. No. 3,853,450 issued Dec. 10, 1974 to the instant applicant, the shaping mandril comprises a base part a shaping ring of deformable material slidable on the base part, and a sleeve part slidable with respect to the base part, said base and sleeve parts being profiled such that in the operative position of the shaping mandril, the shaping ring is locked against axial and radial deformation in an annular chamber formed between the base part and the sleeve part, the outer surface of the shaping mandril having cylindrical portions of step-like varying diameters with conical transition portions. The shaping ring comprises at least one cylindrical portion having a diameter which is larger than the other diameter of the pipe, the base part and the sleeve part having a cylindrical portion whose diameter is substantially equal to the outer diameter of the pipe, the sleeve part having a conical front portion adjoining the cylindrical portion thereof and which is forwards and radially inwards inclined, the smallest diameter thereof being at the most equal to the inner diameter of the pipe.

The bell end is then formed by relative axial movement between the shaping mandril in said operative position and the pipe, resulting in a step-wise expansion of the pre-heated pipe material. By means of an external tool, consisting for example of a pressure ring which can be coaxially secured with respect to the shaping mandril and a split, initially open shaping sleeve, the pressure ring abuts against the shaping sleeve in a given relative position of shaping mandril and pipe, the shaping sleeve being subsequently clamped about the pipe end. In order to release the shaping mandril, first the clamping between the two metal mandril parts is removed; subsequently the base part of the shaping mandril, and after that the shaping ring and the sleeve part, are axially removed from the formed bell end.

In the described known method, after the interior of the bell end has been made accessible by removal of the base part of the shaping mandril therefrom, the deformable shaping ring is first removed, using a suitable tool, from the bell end which has meanwhile cooled, and is subsequently slid by hand onto the base part again. After that, the sleeve part of the shaping mandril is removed from the bell end by means of a hook-like tool which can engage behind the sleeve part inside the bell end and which also serves, in the active position of the shaping mandril, for keeping the metal mandril parts clamped together, after which the shaping material can be brought into the active position again by means of said tool.

SUMMARY OF THE INVENTION

The object of the invention is to provide a method in which the mandril parts can be removed from the formed bell end in a completely mechanical manner, so that a complete cycle of bell forming steps can be carried out faster.

To this end, in the method according to the invention is radially expandable shaping ring is used which, in the operative position of the shaping mandril, is arranged under radial stress on the relevant cylindrical portion of the base part. The base part and the sleeve part have end portions which face each other and which engage into each other such that, after the shaping of the bell end and due to relative movement between the shaping mandril and pipe for axially removing the base part from the bell end, the shaping ring can gradually retreat to the relaxed state by contracting radially while sliding over the base part into a clearance which is being formed between the end portions of the mandril parts moving apart. Subsequently with continued relative movement of shaping mandril and pipe, the sleeve part being movable with the base part, while taking along the shaping ring after the movement apart described above, the mandril including shaping ring can be brought outside the bell end. Finally by axial movement towards each other of the base part and the sleeve part, the shaping ring by sliding over the base part is expanded radially and by cooperation with the engaging end portions of said parts is returned into its locked position. The shaping mandril is then ready to be brought into its operative position again.

In the method according to the invention, during the relative movement between shaping mandril and pipe for removing the mandril from the sell end, a clearance is formed between the cylindrical surface of the base part on which the shaping ring is located when locked and the sleeve part, while the shaping ring is initially arrested against axial movement relative to the pipe by the engaging part of the bell end. The ring therefore slides over the surface of the base part while gradually retreating into the clearance by its elasticity.

The shaping ring is deformed to only a minor extent and only in the radial direction. In contrast with other known methods, in which the shaping ring is forced out of the bell end while being substantially deformed, for example by a hand-held hook, in the method according to the invention the shaping ring is subjected to only minor forces, just sufficient to overcome the friction between shaping ring and shaping mandril.

The invention will be described in detail hereinafter with reference to an embodiment which is diagrammatically shown in the drawing.

BRIEF DESCRIPTION OF THE DRAWING

FIG. 1 is a longitudinal sectional view of an embodiment of an apparatus suitable for practicing to the invention, which is shown at the instant at which a bell end has been formed on a pipe, the lower half of the apparatus having been omitted for the sake of simplicity.

FIG. 2 is a similar sectional view of the apparatus, shown in a subsequent phase of the process.

FIG. 3 is a longitudinal sectional view of a portion of the shaping ring at an increased scale.

FIG. 4 is a longitudinal sectional view of the shaping mandril according to the line IV—IV in FIG. 1.

DESCRIPTION OF THE PREFERRED EMBODIMENTS

Figure 5:
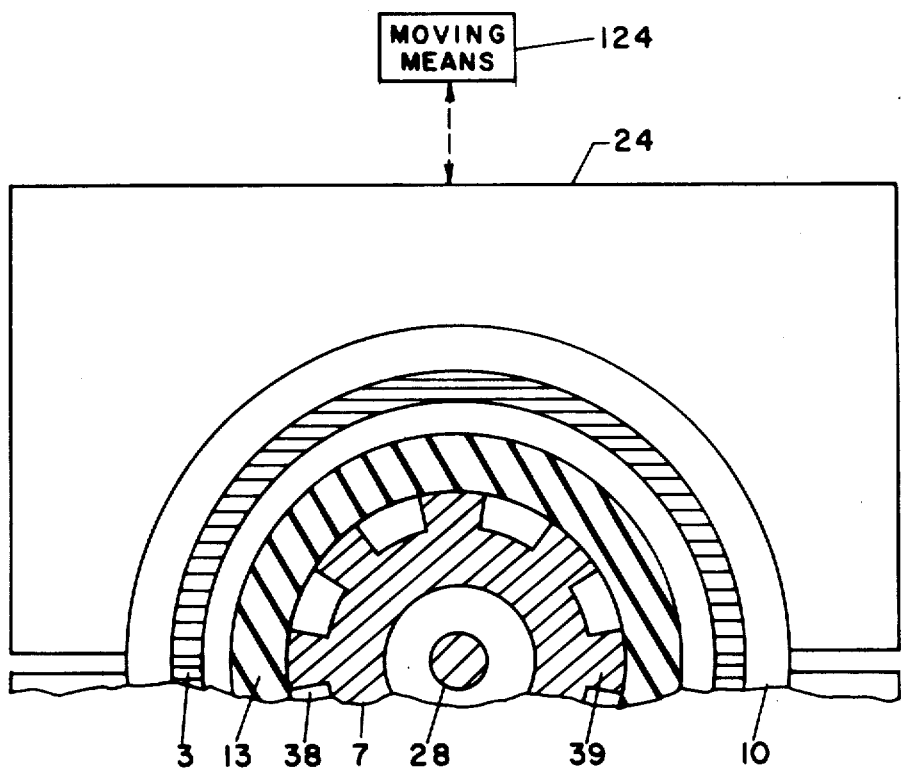
FIG. 5 is an enlarged partial cross-sectional view of the apparatus according to line V—V in FIG. 2.

The apparatus shown in the drawing serves for shaping a bell end 2 on a pipe 1 of thermoplastic material, the inner surface of the bell end 2 locally having a diameter which is larger than the outer diameter of the pipe 1 adjoining the bell end 2 in order to accommodate a sealing ring (not shown) at a latter stage between the bell end and a spigot to be coupled thereto. The opening 3 and the rear part of the bell end, in order to fix the seal therein, has a diameter which is slightly larger than the outer diameter of the original pipe 1.

The pipe 1 is secured in a longitudinally split clamp 4 such that its pre-heated end 2 extends therebeyond. A cylindrical shaping mandril, generally denoted by 5 and supported by the frame coaxially with the pipe clamp 4, and the clamp 4 are moved towards each other after the shaping mandril has been assembled in a manner to be described hereinafter, the heated pipe end then being deformed into the bell end 2 shown while sliding over the shaping mandril 5. The pipe clamp 4 can be connected to the stationary frame, the shaping mandril then being axially movable with respect to the frame.

The shaping mandril 5 has a cylindrical outer surface of step-wise varying diameter, the transitions between neighbouring cylindrical surfaces of different diameter being conical. The shaping mandril 5 consists of a metal base part 7 having a cylindrical surface 6 the diameter of which is slightly larger than the outer diameter of the pipe 1 a shaping ring 13 of rubber or similar elastic material with two cylindrical surfaces 8, 9 the diameter of which is larger than the outer diameter of the pipe 1 and with conical portions 10, 11, 12; and of a metal sleeve part 15 having a cylindrical surface 14 whose diameter is slightly larger than the outer diameter of the pipe 1, and also having a conically declined surface 16.

The shaping ring 13 is first slid over a cylindrical surface 17, having a diameter smaller than that of the rear surface 6, on the base part 7 until its profiled rear edge 18 engages a complementary profiled edge 19 (FIG. 2) on the base part 7, the edge 19 also serving as an abutment preventing further movement of the shaping ring. The sleeve part 15 is subsequently slid over a cylindrical surface 20, having a diameter smaller than that of the surface 17, onto the base part until a profiled edge 21 (FIG. 3) on the sleeve part engages the complementary profiled front edge 22 of the shaping ring 13; in this position further sliding of the sleeve part 15 is prevented as said sleeve part then just abuts against a radial abutment 45 on the base part 7.

Therefore, the shaping mandril 5 is provided with means by which — prior to the relative movement of shaping mandril and pipe for shaping the bell end 2 thereon — the shaping ring can automatically be brought into its operative position on the shaping mandril in an annular chamber formed by the base part 7 and the sleeve part 15; in this position the shaping ring 13 is locked against radial deformation as well as axial deformation by the overlapping edge portions 18 and 19 on shaping ring and base part 7, respectively, on the one side, and by the overlapping edge portions 22 and 21 on shaping ring and sleeve part 15, respectively, on the other side; the sleeve part 15 is then just abutting against a radial abutment 45 which is formed between the cylindrical surfaces 17 and 20 of the base part 7 (to be described in detail hereinafter).

The apparatus is furthermore provided with pressure means for keeping the sleeve part 15 pressed against the base part 7, as will be described hereinafter, so that the restraint of the shaping ring against movement can be continued while the bell end is being formed.

When the shaping mandril 5 and the pipe clamp 4 are moved towards each other, to the position shown in FIG. 1, the bell end can be pressed in known manner, for example, by means of an external tool, against the outer surface of the shaping mandril, with the result that the inner surface of the bell end adopts the shape of the mandril in an accurately calibrated manner. The part of the bell end 2 adjoining the bell end opening 3 can be pressed, for example, by means of a pressure ring 23 moved by a moving means 123 which may be an actuator of any well known kind, and the remaining part of the bell end 2, comprising the cylindrical portions of larger diameter, can be pressed by means of a longitudinally split shaping sleeve 24, operated by a moving means 124 which may be an actuator of any well-known kind, which adjoins the pressure ring 23 and which is arranged to a given distance from the pipe clamp 4.

After the described step has been carried out, the shaping mandril 5 must be removed from the bell end 2 which has meanwhile cooled down sufficiently; however in this position the shaping ring 13 is locked in the bell end 2 by the bell end opening 3 which extends radially inwards as far as the outer rear surface 6 of the base part 7.

The disclosed apparatus for performing the invention enables mechanical and automatic removal of the shaping mandril; in particular the shaping ring removed in a simple manner.

To this end, the shaping mandril 5 is supported to be axially movable on the frame of the apparatus by means of a cylinder 25 which is coaxially arranged in the prolongation of the base part 7 and which is connected thereto. A piston rod 28 of a piston 26 provided with seal 27 and which is reciprocatable inside the cylinder 25, extends axially outwards through an opening 29 with seal 30 in the end wall of the cylinder 25, through a coaxial bore 31 of the base part 7 and terminates in a radial collar 32. In the position shown in FIG. 1, this collar 32 engages a flange 33 which extends radially inwards on the foremost end of the sleeve part 15 which is slidable over the surface 20 of the base part 7, thus keeping the sleeve part rigidly pressed against the base part when pressure medium is admitted into the cylinder 25 via a port 34. The cylinder 25, the piston 26, and the piston rod 28 which engages the flange 33 by way of the collar 32 thus constitute the pressure means for keeping the sleeve part 15 pressed against the base part 7.

In the embodiment of the apparatus shown, the rubber shaping ring 13 is provided with a metal spring member. To this end, a steel wire 36 (see FIG. 3) is embedded in the rubber material by vulcanizing near the cylindrical inner surface 35 of the shaping ring, the wire having the shape of a closed wave-line 36a with a constant amplitude, the wave crests 36b thereof being situated near the profiled edges of the shaping ring.

The dimensions of the shaping ring 13 shown at an increased scale in FIG. 3 have been chosen such that in the relaxed state of the shaping ring its largest outer diameter is smaller than the smallest inner diameter of the bell end formed, and thus also smaller than the largest diameter of the metal shaping mandril portions 7, 15.

In the position of the shaping mandril shown in FIG. 1, the shaping ring 13 is in a radially expanded state and its inner surface 35 bears under tension on the cylindrical surface 17 of the base part 7, the axial dimension of said surface corresponding to that of the shaping ring.

The the metal shaping mandril portions 7 and 15 are advantageously constructed to be complementary on their cooperating, slidably engaging parts; the base part 7 (see FIGS. 2 and 4) comprises a conically declined surface 37 extending from said radial abutment 45 on the front end of the cylindrical surface 17 to the cylindrical surface 20; the surface 37 is provided with recesses 38 (see FIG. 4) extending over an axial distance larger than the axial dimension of the shaping ring 13 and as far as the surface 20, and with intermediate radially outwards extending ribs 39 (see also FIG. 4); the sleeve part 15 comprises an inner cylindrical surface 40 slidable over the cylindrical surface 20 of the base part, recesses 43 which extend as far as a corresponding conically declined inner surface 41 (see FIG. 2), and intermediate radially inwards projecting ribs 42.

The largest radial dimension of said inner conical surface 41 of the sleeve part, which is smaller than the largest radial dimension of the outer surface 14 thereof, terminates near the profiled edge 21 in a radially interrupted abutment 44 which is formed by the edges of the ribs 42 and which cooperates with the radial abutment 45 on the base part which is interrupted by the end edges of the groove-like recesses 43 and which serves to limit the sliding movement of the sleeve part over the base part.

In order to enable removal of the shaping mandril 5 from the bell end 2 formed (see FIG. 2), first pressure medium is admitted into the cylinder 25 via a port 46, with the result that the piston 26, and hence the collar 32 on the piston rod, moves away from the flange 33 on the sleeve part, the clamping action between the shaping mandril portions 7, 15 and also the locking of the shaping ring 13 then being removed. The support of the cylinder 25 on the frame of the apparatus is then moved away from the clamping sleeve 4 together with the pressure ring 23 which is moved by the means 123 and the base part 7. The shaping ring, arrested by the opening 3 of the bell end formed and sliding over the surface 17 and the sleeve part 15 sliding over the surface 20 of the base part 7 remain within the bell end, a clearance being formed between the ribs 39 and 42 of the metal shaping portions 7 and 15 in which the shaping ring can retreat under radial contraction while sliding with its inner surface 35 over the conical outer surface 37 of the ribs 39; the shaping ring then assumes a smaller radial outer dimension until it is completely situated within the outer cylindrical surfaces 6 and 14 of the base part 7 and the sleeve part 15, respectively. Subsequently, by a further movement of the cylinder 25, the sleeve part 15 and the shaping ring 13 are also displaced, via the collar 32 on the piston rod 28, so that they are completely removed from the bell end. The shaping sleeve 24 is then folded open by the moving means 124, like the pipe clamp 4, after which the pipe with bell end can be removed.

The cylinder 25, together with the shaping mandril 5 and the pressure ring 23, is returned to the axial starting position. After that, the shaping ring is secured on the shaping mandril again by admitting pressure medium into the cylinder 25 via the port 34, with the result that the sleeve part 15, taken along by the collar 32 on the piston rod 28, abuts with its abutment face 44 against the front edge 22 of the shaping ring 13, thus pushing this ring along the conical outer surface 37 of the ribs 39 onto the base part 7; the shaping ring is locked in place again, in the axial and the radial direction and under radial expansion on the surface 17 of the base member 7.

What is claimed is:

1. A method of shaping a bell end on a pipe of thermoplastic material, the opening of the bell end having a diameter which is smaller than the maximum diameter of the inner surface of the bell end and substantially equal to the outer diameter of the pipe, by axially inserting a cylindrical shaping mandril into a pre-heated pipe end, said mandril comprising a base part having a diameter equal to the diameter of said opening, comprising the sequential steps of:

radially expanding an elastic shaping ring onto said base part from a relaxed state having an outside diameter at the most equal to said base part diameter to an operative position having a diameter equal to said maximum diameter;

restraining said shaping ring against axial movement with respect to said base part;

moving at least one of said mandril and said pipe axially with respect to each other so as to insert said mandril into an end of the pipe;

causing a bell end portion of the pipe to deform inwardly so as to form a bell end having an opening whose diameter is smaller than said maximum diameter;

cooling said pipe such that the shape formed about the mandril will be retained;

continuing said restraining step while said moving, causing and cooling steps are performed;

forming a space radially inward from said shaping ring so as to establish a clearance under the shaping ring;

allowing said shaping ring to contract elastically into said clearance; and lastly moving at least one of said mandril and said pipe axially with respect to each other so as to remove said mandril from said end of the pipe.

2. A method as claimed in claim 1 for shaping bells on a succession of pipe ends, wherein said mandril also comprises a shaping ring of elastically deformable material slidable on the base part, and a sleeve part slidable with respect to the base part, outer surfaces of said base part, shaping ring and sleeve while in an operative position having a profile same as a desired interior profile of the bell end to be formed, comprising in addition the step, after said lastly moving step, of moving at least one of said base part and said sleeve toward each other so as to close said clearance while simultaneously displacing said shaping ring radially outwards and axially with respect to said base part so as to reestablish said operative position, culmination of said step of moving toward each other restraining said shaping ring against radial and axial movement with respect to said base part.

* * * * *